No. 666,550. Patented Jan. 22, 1901.
S. B. PARSONS.
BICYCLE SUPPORT.
(Application filed Sept. 21, 1900.)
(No Model.)
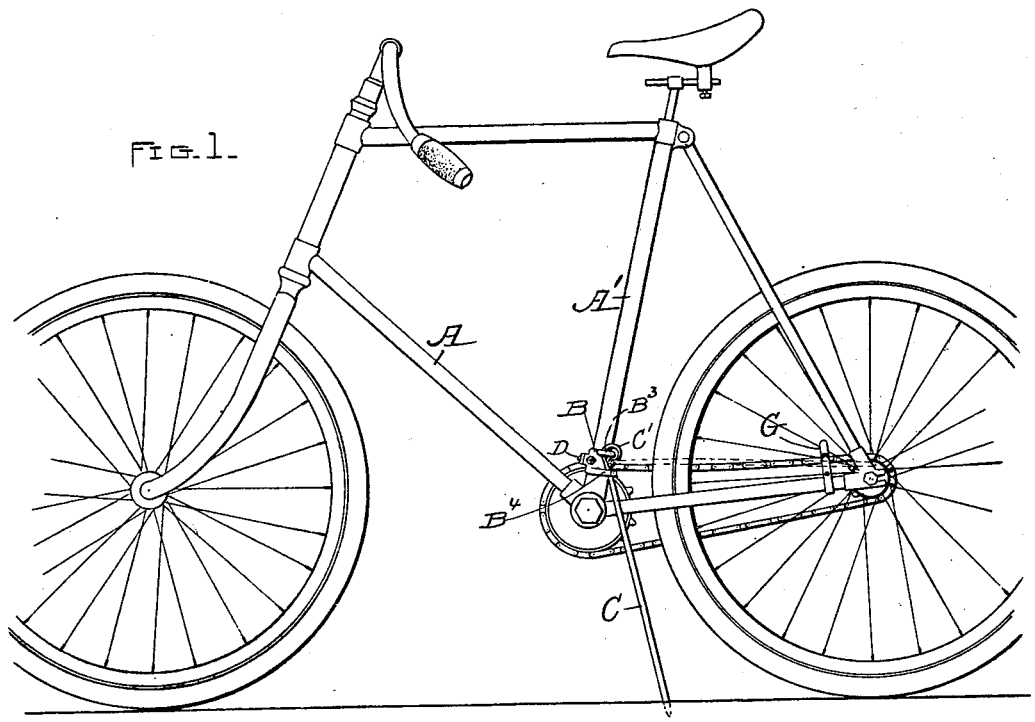
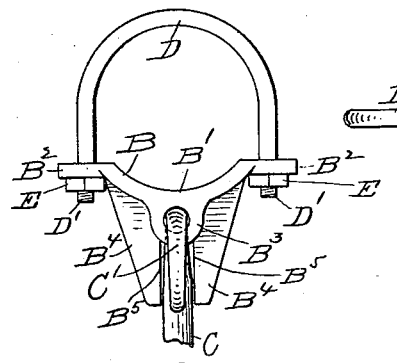
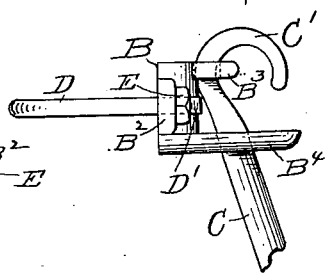
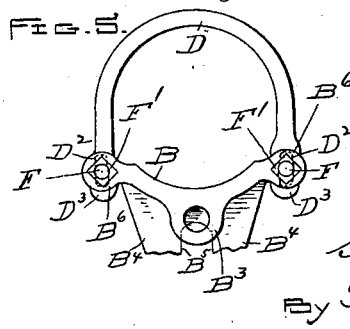
Witnesses;
W. B. Nourse,
E. N. Barker.
Inventor;
Samuel B. Parsons,
By A. H. Barker, Att'y.
THE NORRIS PETERS CO., PHOTO-LITHO., WASHINGTON, D. C.

UNITED STATES PATENT OFFICE.

SAMUEL B. PARSONS, OF WORCESTER, MASSACHUSETTS.

BICYCLE-SUPPORT.

SPECIFICATION forming part of Letters Patent No. 666,550, dated January 22, 1901.

Application filed September 21, 1900. Serial No. 30,665. (No model.)

*To all whom it may concern:*

Be it known that I, SAMUEL B. PARSONS, of the city and county of Worcester and State of Massachusetts, have invented certain new and useful Improvements in Bicycle-Supports; and I do hereby declare that the following is a full, clear, and exact description thereof, reference being had to the accompanying drawings, forming a part of this specification, and in which—

Figure 1 represents a side view of so much of a bicycle as is necessary to illustrate the application of my invention thereto. Fig. 2 represents, upon an enlarged scale, a plan of the clamp-bearing of my improved supporting device which will be hereinafter more fully described, all the following figures also being upon the same enlarged scale. Figs. 3 and 4 are a front and a side view, respectively, of the parts shown in Fig. 2; and Fig. 5 shows a modification in the mode of clamping said bearing to the bicycle-frame, as will also be hereinafter more fully described.

The object of my invention is to provide an adjustable bicycle-support which shall be simple in construction and which may serve as an effective support to hold the bicycle in an upright position when not in use.

Said invention consists in combining with the frame of the bicycle a specially-constructed bearing which may be clamped to said frame and of a swivel-rod loosely pivoted at one end to said bearing and whose opposite end is adapted to be inserted into the ground at one side of the bicycle to form a lateral brace therefor, as will be hereinafter more fully set forth.

To enable others skilled in the art to which my invention appertains to better understand the nature and purpose thereof, I will now proceed to describe it more in detail.

In the drawings, A represents the bicycle-frame to which my improved support is attached. In this instance it is attached to the lower end of the upright post A' of the diamond frame; but, if desired, it may be connected with any other convenient part of the frame. Said support comprises the bearing B and brace-rod C. The bearing is shaped to fit the post A' upon one side B' and is provided with a yoke D, which fits around the post A' and whose threaded ends D' D' pass through horizontal holes in the vertical ears $B^2$ $B^2$ of bearing B and are held to clamp the bearing to the post by means of nuts E E, turned onto the threaded ends D' D', against the outer sides of the ears $B^2$ $B^2$, as is shown in Fig. 2. Upon bearing B are also formed the central horizontal top flange $B^3$, through whose vertical hole is passed the hooked end C' of brace-rod C, and the horizontal bottom flanges $B^4$ $B^4$, extending out from the bearing under flange $B^3$, said flanges being provided with substantially parallel inner edges $B^5$ $B^5$ and at the proper distance apart to receive the hooked brace-rod C, about at the base of its hook C', as is shown in Figs. 3 and 4. The flange $B^3$, it is obvious, thereby holds the rod in position longitudinally, being pivoted thereto, and the flanges $B^4$ $B^4$ hold said rod in position from moving laterally. Consequently when the device is attached to the bicycle, as is shown in Fig. 1, with the outer end of rod C inserted into the ground at one side of said bicycle, the latter is braced and supported in a firm and substantial manner from tipping over out of a vertical position.

If preferred, the ends of yoke D may be fastened to bearing B by forming vertical slots $D^2$ $D^2$ through the flattened ends $D^3$ $D^3$ of said yoke and passing bolts F F vertically through holes in the horizontal ears $B^6$ $B^6$ of the bearing, which are held in place by nuts F' F', as is shown in Fig. 5. I also reserve the right to make such other modifications in the construction as may be deemed desirable in practice coming within the scope of my invention.

I am aware that a bicycle-support is not broadly new, and I therefore limit my invention to the special construction herein set forth and principally to the construction of the bearing B and the application of the brace-rod C thereto, whereby said rod may be easily attached and detached to and from the same and whereby when said rod is attached thereto by passing its hooked end C' up through the flange $B^3$, with its shank lying between the flanges $B^4$ $B^4$, the parts may be held firm and rigid in both a longitudinal and lateral direction. This feature of thus holding the rod so that when the device is applied to the bicycle it will also hold that firmly in an upright position, as previously described, is the main and essential feature of my invention and is an important one, as will at once be apparent to all bicycle-riders.

By the use of my device the rider may leave his or her bicycle anywhere in an upright position safe from falling over, and when not in use the rod may be swung up into a horizontal position and supported in a suitable clip G, fastened to the frame near the rear-wheel axle. Said clip not constituting a part of my invention except in combination with my improvement, it will be unnecessary to describe the same. Any ordinary spring-clip will answer the purpose.

Having now described my invention, what I claim therein as new, and desire to secure by Letters Patent, is—

The combination of the bicycle-frame, with the bearing B, having the horizontal top flange $B^3$, provided with a vertical opening, also having the horizontal, bottom flanges $B^4$ $B^4$ under flange $B^3$, and whose inner edges are separated about the width of the diameter of the supporting-rod C, said bearing also being provided with ears $B^2$ $B^2$ at each side of the aforesaid flanges, the yoke D adapted to pass around the bicycle-frame, means for attaching the ends thereof to said ears $B^2$ $B^2$, and the rod C which fits between the bottom flanges $B^4$ $B^4$ and is provided with a hook $C'$ at one end adapted to be passed up through the opening in top flange $B^3$ to loosely pivot the same thereto so that the rod may be swung around in any direction when lifted from between said flanges $B^4$ $B^4$, and also whereby it may be readily detached by simply unhooking it from its pivot, substantially as and for the purpose set forth.

SAMUEL B. PARSONS.

Witnesses:
A. A. BARKER,
N. B. PARSONS.